United States Patent [19]

Runshang

[11] 3,906,357
[45] Sept. 16, 1975

[54] METHOD AND APPARATUS FOR TESTING AN OBJECT FOR FLAWS CONSISTING OF TWO SENSORS SPACED APART ALONG THE OBJECT PATH AND EACH CONNECTED TO A COMMON MARKER

[75] Inventor: Anthony A. Runshang, Sewickley, Pa.

[73] Assignee: AMF Incorporated, White Plains, N.Y.

[22] Filed: June 29, 1973

[21] Appl. No.: 374,919

[52] U.S. Cl. .................................... 324/37
[51] Int. Cl. ............................... G01r 33/12
[58] Field of Search ...................... 324/37, 40

[56] References Cited
UNITED STATES PATENTS

| 3,287,632 | 11/1966 | Tompkins | 324/37 |
|---|---|---|---|
| 3,290,167 | 6/1966 | Wood et al. | 324/37 |
| 3,469,182 | 9/1969 | Wycherley et al. | 324/37 |
| 3,535,623 | 10/1970 | Wood et al. | 324/37 |
| 3,535,624 | 10/1970 | Wood | 324/37 |
| 3,568,051 | 3/1971 | Vild | 324/37 |
| 3,673,493 | 6/1972 | Hoffman et al. | 324/37 |
| 3,675,118 | 7/1972 | Booth | 324/37 |
| 3,676,959 | 7/1972 | Forster | 324/37 |

FOREIGN PATENTS OR APPLICATIONS

| 1,161,106 | 8/1969 | United Kingdom | 324/40 |

Primary Examiner—Robert J. Corcoran
Attorney, Agent, or Firm—George W. Price; John H. Gallagher

[57] ABSTRACT

Method and apparatus for automatically applying paint marks to a pipe at the longitudinal and circumferential locations where anomalies are detected by nondestructive inspection apparatus. The inspection apparatus consists of two inspection units spaced apart along the path of the object. The first unit senses for circumferential flaws. The second unit senses for longitudinal flaws. The sensor outputs are each fed to a shift register which transmits the flaw information to a marker downstream.

4 Claims, 7 Drawing Figures

METHOD AND APPARATUS FOR TESTING AN OBJECT FOR FLAWS CONSISTING OF TWO SENSORS SPACED APART ALONG THE OBJECT PATH AND EACH CONNECTED TO A COMMON MARKER

BACKGROUND OF THE INVENTION

In a pipe mill where lengths of pipe are continuously formed, as by the electrical resistance process, it is desirable that the lengths of pipe be nondestructively inspected for defect anomalies as they pass from the welding apparatus or from the length cutting saw. As disclosed in U.S. Pat. No. 3,290,167 issued to Wood et al. on Dec. 6, 1966, it is known to inspect the pipe and place a paint mark on the pipe at a longitudinal location thereon which corresponds to a location where an anomaly was detected. The paint marking device may be a paint gun or paint spray can that is located downstream from the location of the nondestructive inspection equipment. The above-mentioned patent discloses means for assuring that the paint mark is properly located longitudinally on the pipe at the place corresponding to where the anomaly was detected. That system has been useful but becuase the paint mark indicates only that an anomaly may be present somewhere at that longitudinal portion of the pipe, an inspector must examine the entire circumference of the pipe at that longitudinal position to find the anomaly. This requires considerable time and handling on the part of the inspector, and in the event that more than one anomaly exists at different circumferential locations at a given longitudinal position, the inspector may find and investigate one of the anomalies but he may completely overlook other anomalies at the same longitudinal position.

SUMMARY OF THE INVENTION in accordance with the present invention, a length of pipe is nondestructively inspected by two different inspection units. In the preferred embodiment described herein, both inspection units employ the magnetic flux leakage inspection technique. The first unit employs a plurality of N inspection shoes each having detector means therein for detecting anomalies including circumferentially extending anomalies in the pipe. These N inspection shoes are equally spaced at fixed circumferential positions about the pipe that moves longitudinally, or axially, through the circumferentially arranged shoes. The second inspection unit employs two rotating inspection shoes for detecting anomalies including longitudinally directed anomalies. As the shoes of the second inspection unit rotate about the pipe, means are provided for dividing each rotation of the shoes into N equal angular segments which correspond to the N segments of the pipe being inspected by the N shoes of the first inspection unit. All detected anomaly signals of the second inspection unit are then separated into respective ones of N signal channels which correspond to the N angular segments. N paint spray means are positioned downstream of the two inspection units and when the pipe arrives at the paint spray location, one or more paint marks are placed on the pipe at the longitudinal position and angular segment thereof corresponding to the angular segment where one or more anomalies were detected by the two inspection units. Other features associated with a fully operative paint marker system also are described.

BRIEF DESCRIPTION OF THE DRAWINGS

The invention will be described be referring to the accompanying drawings wherein.

DESCRIPTION OF PREFERRED EMBODIMENT

Figure 1:
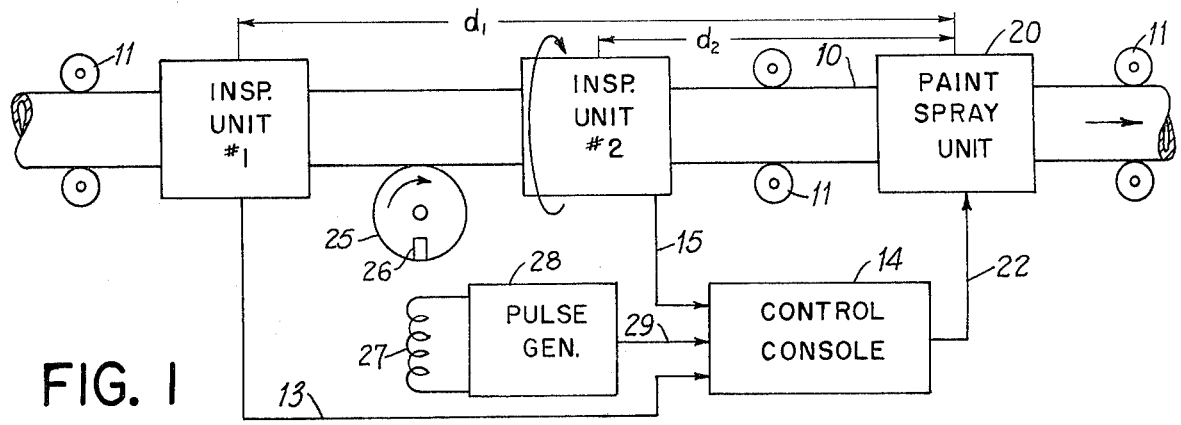
FIG. 1 is a simplified illustration showing the general arrangement of apparatus for practicing the present invention.

In FIG. 1, the pipe 10 or other type of tubular goods being inspected moves on rolls 11 from left to right, substantially without rotation. A given section of the pipe first passes through inspection unit number 1 which functions to detect potentially objectionable anomalies and especially anomalies that extend in a circumferential direction around the pipe. Inspection signals corresponding to anomalies detected by inspection unit number 1 are coupled over one or more leads of cable 13 to a control console 14 which is comprised of signal processing and logic circuitry, as will be explained below. The given section of pipe next passes through inspection unit number 2 which functions to detect potentially objectionable anomalies and especially amonalies that extend longitudinally along the length of the pipe. Inspection signals corresponding to amonalies detected by inspection unit anomalies 2 are coupled over one or more leads of cable 15 to control console 14. the given section of pipe then passes through paint spray unit 20 which includes a plurality of paint spray guns or pressurized paint spray cans, commonly called aerosol paint spray cans. The paint cans, for example, are arranged circumferentially around the periphery of pipe 10 and are respectively activated by a corresponding lead in cable 22 to place a paint mark at the longitudinal and circumferential position on the pipe where a potentially objectionable anomaly was detected by one of the inspection units.

A wheel or roller 25 is positioned to contact the outer surface of pipe 10 and is rotated by the pipe as it moves longitudinally. A permanent magnet 26 is located in the periphery of wheel 25 and once each revolution of the wheel, magnet 26 passes by and excites pickup coil 27. Each excitation of coil 27 triggers pulse generator 28 which produces on lead 29 a train of pulses whose repetition frequency, or spacing, is a function of the speed of movement and the length of pipe that passed through the inspection units in a given unit of time. Other types of velocity, distance, or rotation sensing means are well known in the art and may be employed in the place of wheel 25, magnet 26 and coil 27 to provide a train of corresponding pulses on lead 29. The train of pulses is coupled as an input to control console 14.

In the present description it is assumed that the two inspection units employ the magnetic flux leakage detection technique which is well understood by those skilled in the art and will not be explained herein. Inasmuch as the inspection technique and types of apparatus for carrying out the inspection are well understood, the inspection units 1 and 2 are shown only in simplified form in FIGS. 2 and 3.

Figure 2:
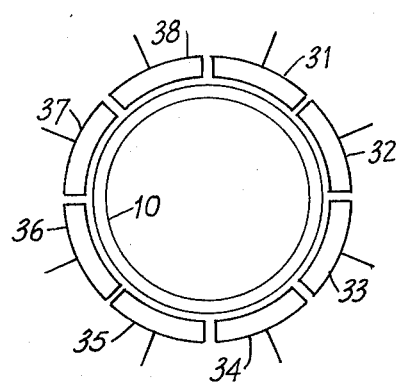
FIGS. 2 and 3 are simplified drawings illustrating certain features of inspection units 1 and 2 illustrated in FIG. 1.

In FIG. 2, inspection unit number 1 includes eight search shoes 31 through 38 which are fixed in position circumferentially about, and ride on, pipe 10. In practice, the even numbered shoes would be arranged in one transverse plane through pipe 10 and the odd numbered shoes would be arranged in a second transverse plane axially spaced from the first plane. Shoes in the two planes which are angularly adjacent each other overlap their coverage of the pipe wall to assure complete inspection of the pipe. Each of the search shoes contain one or more pick up coils which respond to an irregularity or flux leakage in a longitudinally directed magnetic flux field produced by a permanent or electromagnet, not illustrated, to produce a corresponding inspection signal. As is evident, each of the stationary search shoes 31–38 inspects an angular segment of N/360°, where N is the number of search shoes. As an example, search shoes 31–38 may be constructed and arranged as illustrated in more detail in U.S Pat. No. 2,881,386 issued Apr. 7, 1959 to Price et al.

Figure 3:
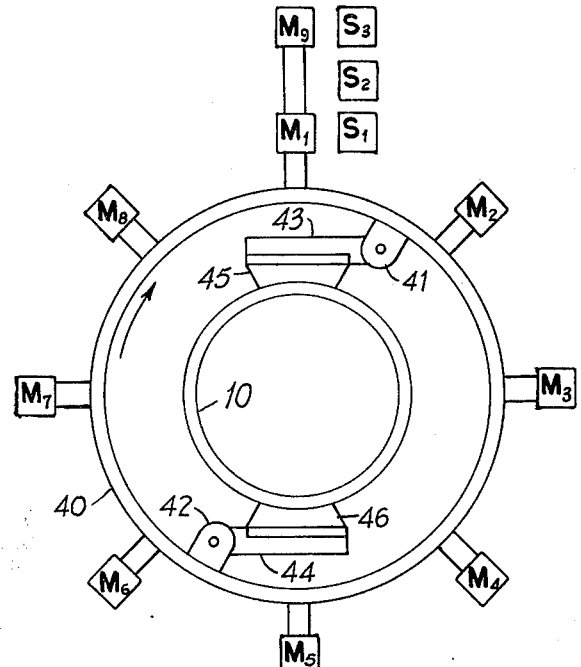

Search unit number 2 is illustrated in FIG. 3 and includes a ring member 40 which is suitably mounted by means not illustrated for rotation coaxially about pipe 10. At diametrically opposite locations on the interior of ring member 40 respective brackets 41 and 42, and spring loaded lever arms 43 and 44, support respective search shoes 45 and 46 which ride on and rotate about the outer surface of pipe 10 as the pipe moves axially through rotating ring member 40. Search shoes 45 and 46 each include one or more flux leakage pick up coils.

In the practice of the present invention it is necessary to know the angular positions of the search shoes 45 and 46 as they rotate. To accomplish this, N permanent magnets $M_1$ through $M_8$ are secured about the periphery of ring member 40 to define eight (N) equiangular segments. A magnetically actuated switch $s_1$, such as a reed relay switch, is positioned at a fixed location adjacent the circular path in which the magnets $M_1$–$M_8$ rotate so that switch $S_1$ is actuated each time one of the magnets passes thereby. Each actuation of switch $s_1$ therefore indicates that ring 40 has rotated through an angular segment of N/360°. In practice, switch $s_1$ may be located in a vertical plane in order to establish a 0° reference position with respect to the rotating apparatus of FIG. 3.

A permanent magnet $M_9$ is fixedly positioned on ring member 40 in angular coincidence with search shoe 45, and permanent magnet $M_{10}$ is fixedly positioned on ring member 40 in angular coincidence with search shoe 46. Respective magnetically actuated reed switches $s_3$ and $s_2$ are positioned in the vertical reference plane, at 0°, to be actuated respectively by magnets $M_9$ and $M_{10}$, which are respectively radially spaced relative to magnets $M_1$–$M_8$. Therefore, each time switch $s_2$ is actuated search shoe 46 is at the 0° reference position and each time switch $s_3$ is actuated search shoe 45 is at the reference position.

Rotary apparatus which may be used with inspection unit number 2 is shown and described in U.S. Pat. No. 3,582,771 issued to Placke on June 1, 1971.

Paint spray unit 20 of FIG. 1 may be comprised of a fixed mounting structure such as a flat plate which has a circular aperture therein through which pipe 10 passes. Mounted on the plate are eight (N) pipe marking means such as paint spray guns, or preferably, pressurized spray paint cans of the aerosol type that are commercially available. The spray paint cans are removably held in adjustable mounting means so that the directed spray from each of the cans will fall on a respective one of the eight (N) angular segments which correspond to the angular segments inspected by search shoes 31–38 in inspection unit number 1, FIG. 2, and corresponding to an angular segment, relative to the zero degree reference position, defined with respect to inspection unit number 2, FIG. 3.

Figure 4:
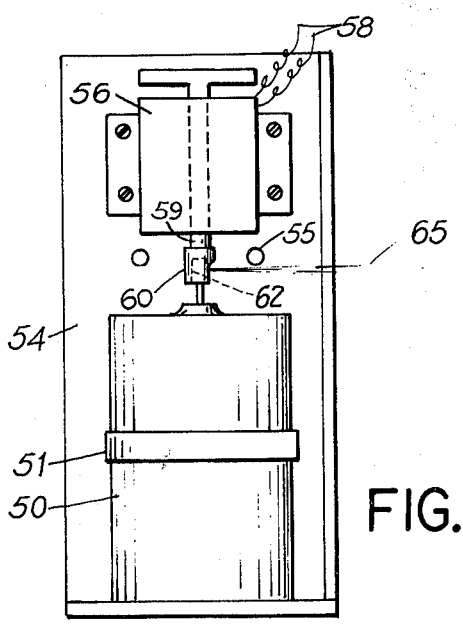
FIG. 4 is an illustration of means for mounting and operating a pressurized spray paint can.

As illustrated in FIG. 4, pressurized spray paint can 50 is secured by suitable means such as a releasable strap 51 to a supporting bracket plate 54 which in turn may be secured to the above-described mounting plate surrounding pipe 10 by means of bolts that pass through apertures 55 in bracket plate 54. A solenoid 56 having electrical leads 58 is mounted at the top portion of bracket plate 54. The movable armature of solenoid 56 is coupled to a plunger 59 which has a cap 60 thereon which receives the actuating button 62 of the spray paint can. As is common, a spray nozzle is located in the actuating button of the spray can and upon depression of the button an aerosol spray of paint 65 is dispensed in a confined pattern. When solenoid 56 is unenergized, plunger 59 is in an upwardly retracted position so as to permit actuating button 62 to be at its outermost position. Energization of solenoid 56 moves its plunger 59 downwardly to depress actuating button 62 and dispense the aerosol spray 65 of paint. Four of the paint cans may be mounted on each side of the above-mentioned flat mounting plate and each can directs its spray radially inwardly onto a respective angular segment of pipe 10.

As illustrated in FIG. 1, spray paint unit 20 is located a distance $d_1$ downstream from inspection unit number 1 and a distance $d_2$ downstream from inspection unit number 2.

Figure 5A:
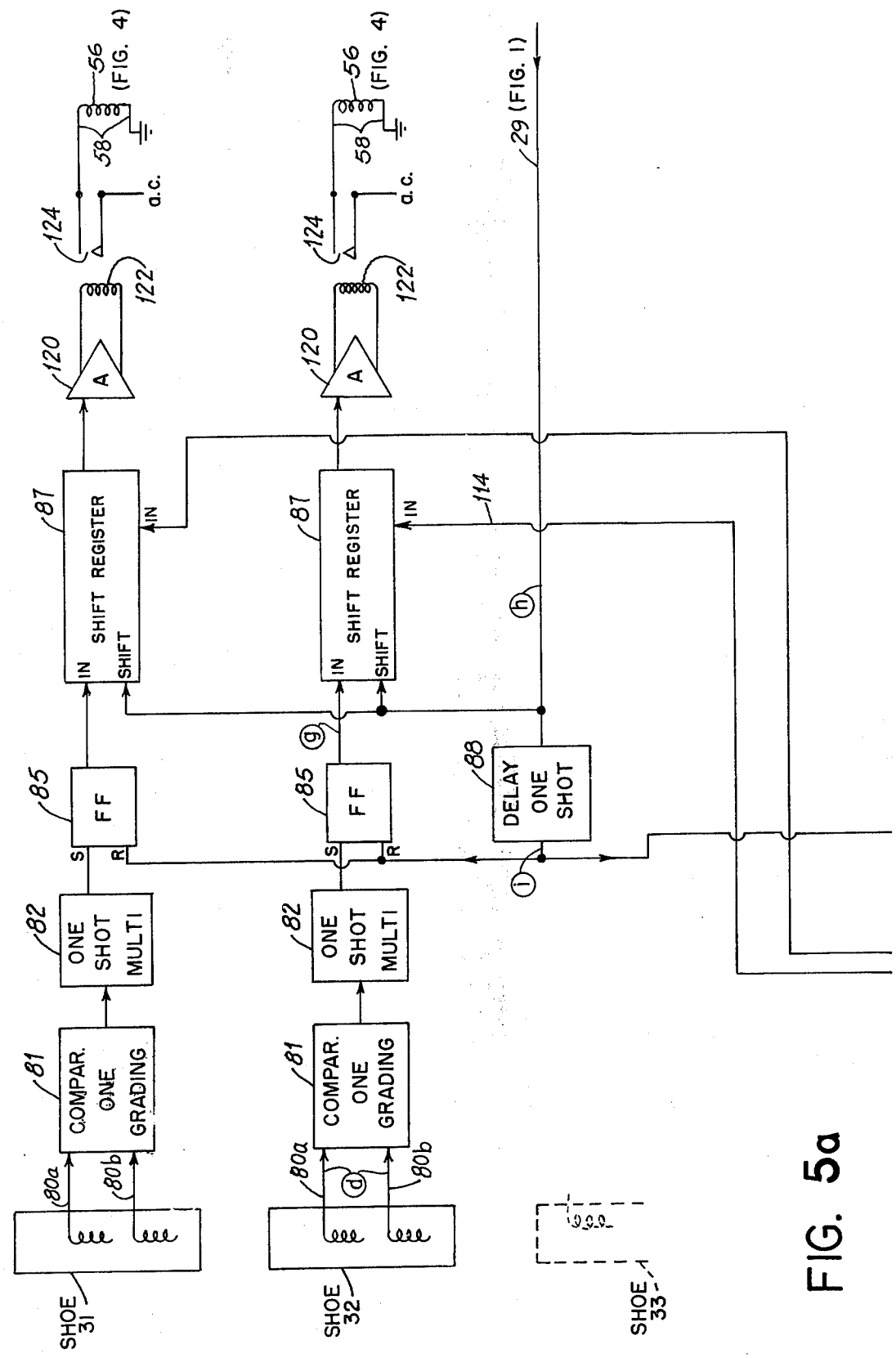
FIGS. 5a and 5b are simplified circuit or logic diagrams illustrating electronic means for carrying out the present invention.

The electronic system for processing the anomaly signals to actuate the appropriate paint spray can at the proper time will be described by referring to FIGS. 5a and 5b. These two figures are to be used together inasmuch as the system has been illustrated on the two drawings because of space requirements. The left side of FIG. 5a illustrates the inspection or anomaly signal channels associated with search shoes 31–38 of inspection unit number 1, FIG. 2. Because all the signal channels are substantially identical, only two have been illustrated, and in order not to unduly lengthen the description, only one channel will be described in detail; it being understood that all channels operate in the same manner. Search shoes 31 and 32 are illustrated as each having two magnetic flux leakage detection coils. As mentioned, as many coils as desired may be employed in the search shoes.

Figure 5B:
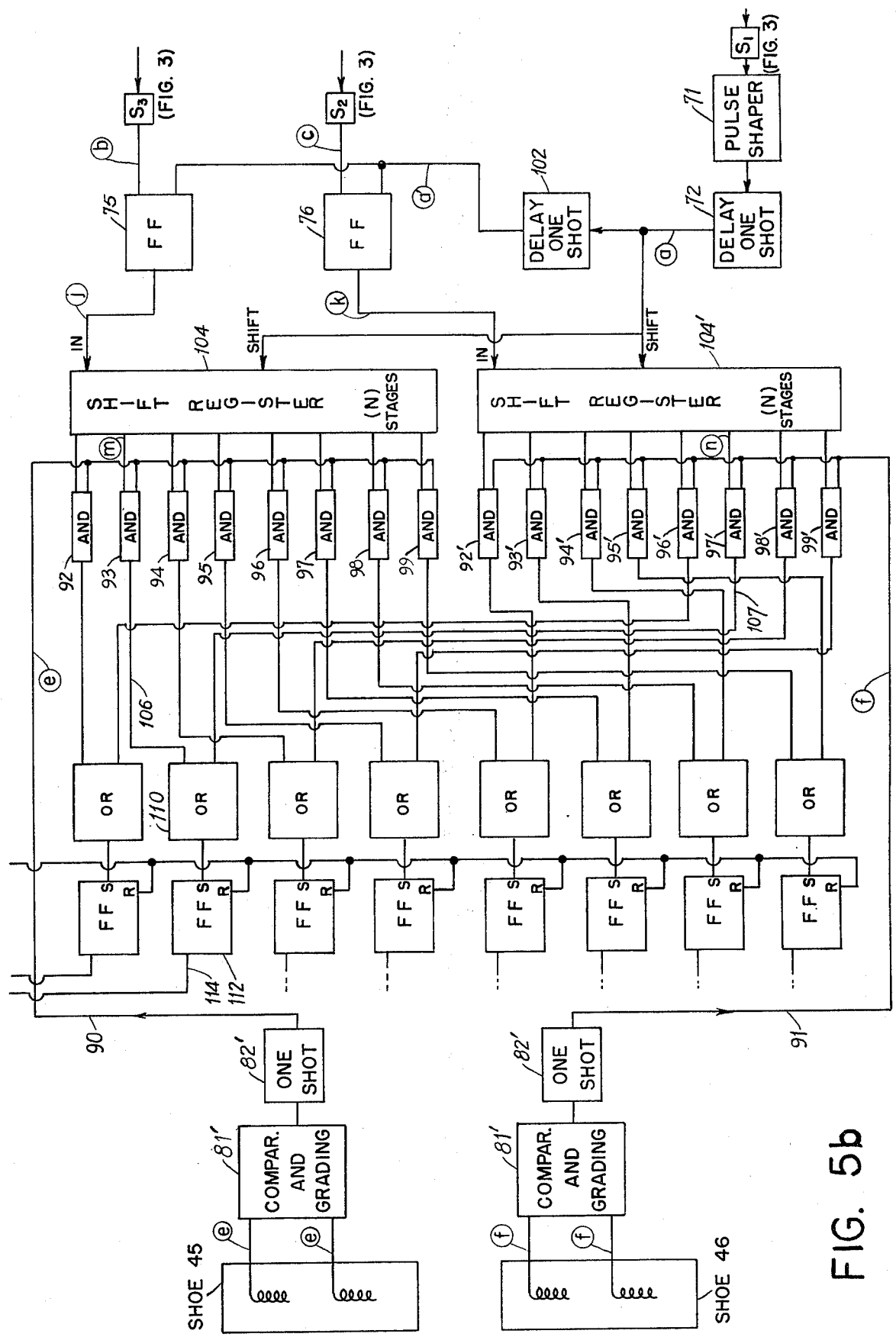

The left side of FIG. 5b illustrates the inspection or anomaly signal channels associated with search shoes 45 and 46 of inspection unit number 2, FIG. 3. Again, as an example, two coils are illustrated in each shoe.

Referring now to the right side of FIG. 5b, the angular sector pulses produced by switch $S_1$, FIG. 3, each time one of the magnets $M_1$–$M_8$ passes thereby are illustrated as being coupled in at the bottom of the figure. These pulses are shaped in pulse shaper 71 and delayed by delay one shot multivibrator 72 to provide the angular sector pulses illustrated as waveform a in FIG. 6. If desired, the delay provided by one shot delay 72 may instead be provided by appropriate angular positioning of switch $S_1$ in FIG. 3.

The pulses produced by the closing of switch $S_3$ when magnet $M_9$ and shoe 45, FIG. 3, are at the reference position are coupled to the set input of flip flop 75. These pulses occur once per revolution of inspection unit number 2 and are illustrated by waveform $b$ of FIG. 6. Similarly, pulses produced by the closing of switch $S_2$ when magnet $M_{10}$ and shoe 46 are at the reference position are coupled to the set input of flip flop 76, and are illustrated by waveform $c$ of FIG. 6.

Output lead 29 of pulse generator 28, FIG. 1, is illustrated on the right side of FIG. 5a. Lead 29 provides shifting and resetting pulses, as will be described.

Figure 6:
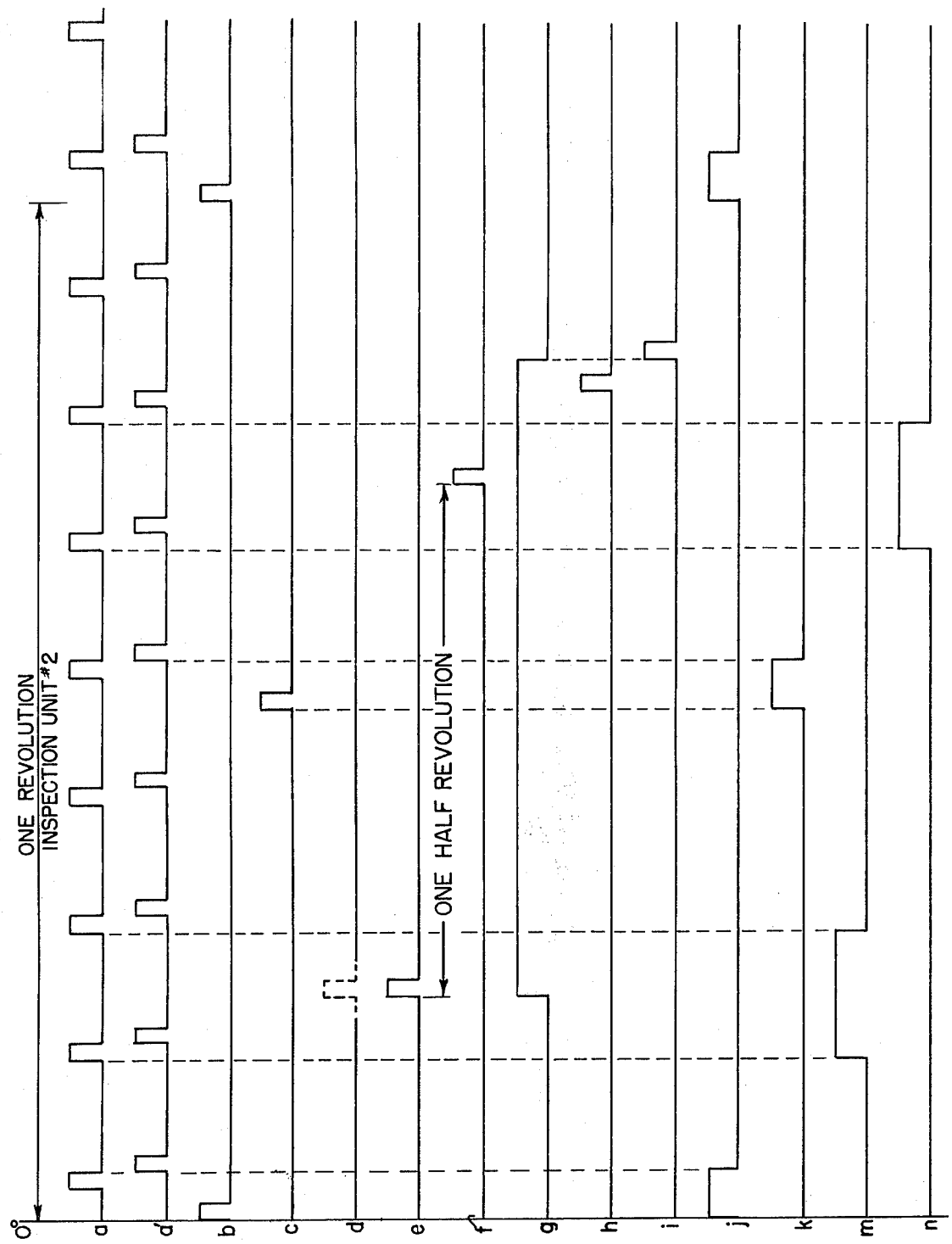
FIG. 6 is a waveform diagram used in explaining the operation of the circuitry of FIGS. 5a and 5b.

For purpose of discussion, it will be assumed that a defect anomaly in pipe 10 is detected by search shoe 32 in inspection unit number 1. This means that the anomaly is in the second angular sector, going clockwise from the zero reference position illustrated in FIG. 3. The anomaly signal corresponding to this defect is illustrated by waveform $d$ in FIG. 6. It also is assumed that the same defect is detected by rotating search shoes 45 and 46 in inspection unit number 2 when pipe 10 passes therethrough. The anomaly signals from shoes 45 and 46 are illustrated by waveforms $e$ and $f$ in FIG. 6. It is seen that these signals occur in the second angular segment for waveform $e$ and occur four angular segments later for waveform $f$ since search shoe 46 will detect the defect anomaly one-half of a revolution later than shoe 45. It will be understood that in real time the pulse of waveform $d$ will occur prior to waveforms $e$ and $f$ because the inspection units 1 and 2 physically are spaced by the distance $d_1-d_2$. However, to facilitate this description and illustration they are illustrated in FIG. 6 in the same time period. Proper account will be made for this fact in the following description, and, of course, the system operation is based on the inspection units being separated. As a reminder of the fact just discussed the pulse signal of waveform $d$ is illustrated with broken lines.

Referring now to FIG. 5a, the anomaly signal detected by search shoe 32 of inspection unit number 1 is coupled over leads 80a and 80b to a signal comparator and grading circuit 81 which in the first instance compares the magnitude of the signal against a reference voltage so that only signals which potentially may be defect anomaly signals will be passed. The passed signal may be further processed to compare them against voltage references in order to grade or classify the anomaly signals as either a questionable defect or an absolute defect. Separate means, not illustrated, may provide such grading indications. Also, the anomaly signals may be separated, classified and graded according to whether they are on or near the inside diameter or outside diameter of the pipe. The extent and degree of classification and grading of anomaly signals usually will be determined by the requirements of the mill owner. Because comparator and grading circuitry 81 are known in the art and are not the essence of the present invention, further explanation is believed unnecessary.

The anomaly signal output from comparator circuit 81 is coupled to one shot multivibrator 82 which is triggered to set flip flop 85 into the second of its stable states, see waveform $g$. The next shift pulse that occurs on line 29, waveform $h$, shifts the anomaly signal into the first stage of multi-stage shift register 87. The shift pulse on line 29, waveform $h$, is delayed by delay one shot multivibrator 88 to produce the waveform $i$ which is coupled to reset flip flop 85 to return it to its first stable state, see waveform $g$. As successive shift pulses occur on line 29 (indicating units of longitudinal travel of pipe 10) the anomaly signal is successively propagated through higher numbered stages of shift register 87. The total number of stages in shift register 87 is chosen so that the number of shift pulses $h$ produced by pulse generator 28, FIG. 1, in the time that it takes a given anomaly to travel the distance $d_1$ from inspection unit number 1 to paint spray unit 20 will be the number required to shift the anomaly signal to the output stage of the register at a time coincident with the arrival of that given anomaly at paint spray unit 20.

However, assuming for the moment that pipe 10 has traveled only the distance $d_1-d_2$, the anomaly of this discussion now will be at inspection unit number 2 and search shoe 45 will detect the anomaly when the shoe is in the second angular segment to produce the anomaly signal of waveform $e$. Similarly, search shoe 46 will produce the anomaly signal of waveform $f$ one-half revolution later. These anomaly signals from shoes 45 and 46 are processed by comparator and grading circuitry 81' which may be substantially identical to the circuitry described above in connection with blocks 81. The corresponding defect anomaly signals then trigger respective one shot multi-vibrators 82' whose corresponding output signals are coupled over respective leads 90 and 91 to provide one input to each of the AND gates 92–99 and 92'–99', respectively. The other input signals to AND gates 92–99 and 92'–99' are enabling pulses which enable the eight (N) AND gates of the two groups for respective time periods which correspond to the time that search shoes 45 and 46 are in the successive angular segments of a rotation around pipe 10. The enabling pulses are produced as follows.

The pulses of waveform $a$ which define the angular segments of a revolution are delayed by delay one shot multivibrator 102 to produce delayed angular segment pulses of waveform $a'$ of FIG. 6. Thses pulses are coupled as reset pulses to flip flops 75 and 76. Flip flop 75 is set to its second stable state by the pulse of waveform $b$ each time search shoe 45 passes the reference position of its revolution and is reset by the immediately following delayed angular segment pulse of waveform $a'$ to produce the pulse of waveform $j$.

In a similar manner, flip flop 76 is set to its second stable state by the pulse of waveform $c$ each time search shoe 46 passes the reference position and is reset by the immediately following delayed angular segment pulse of waveform $a'$ to produce the pulse of waveform $k$.

Waveforms $j$ and $k$ are respectively coupled as input signals to identical eight (N) stage shift registers 104 and 104'. The inputs to shift registers 104 and 104' are successively shifted through the stages by the angular sector pulses of waveform $a$ so that the outputs of the N stages of the two registers are successively energized in synchronism with the passage of shoes 45 and 46 through the N angular segment of a revolution. The outputs of the successive stages of shift registers 104 and 104' are respectively coupled as the enabling signals to AND gates 92–99 and 92'–99'. The enabling signals which occur simultaneously with the defect anomaly signals of waveforms $e$ and $f$ are illustrated by waveforms *m* and *n* and are present at the inputs to AND gates 93 and 97'. The anomaly signals *e* and *f* therefore are gated through respective AND gates 93 and 97', are coupled over leads 106 and 107, and in turn are coupled through OR gate 110 to set flip flop 112 in its second stable state which energizes lead 114, which is an input to an intermediate stage of shift register 87. The number of stages in register 87 between input lead 114 and the output is equal to the number of shift pulses produced by pulse generator 28 during the time a given anomaly in pipe 10 travels the distance $d_2$ from inspection unit number 2 to paint spray unit 20.

Recalling from the above discussion that the anomaly signal of waveform *d* already had entered shift register 87 and has been propagating through the stages in response to earlier occurring, but not illustrated, shift pulses *h* on line 29, by the time that anomaly signal reaches the stage of the register where lead 114 is coupled as an input, flip flop 112 has transferred to its second stable state. Therefore, when the next shift pulse of waveform *h* occurs on line 29, the anomaly signals detected by both inspection units 1 and 2 will be shifted into the stage of shift register 87 corresponding to the location of inspection unit number 2 and the signals will be shifted as one through to the output of the register as the detected anomaly on pipe 10 travels to and arrives at paint spray unit 20.

When the anomaly signal is shifted out of register 87 it is passed through driver amplifier 120 which in turn energizes relay solenoid 122 to close the contacts 124. Contacts 124 are coupled to a source of voltage and to lead 58 of the actuating solenoid 56 of paint spray can 50, FIG. 4. When contacts 124 close, solenoid 56 is energized to cause the paint spray can in the second angular sector of the paint spray unit to direct a spray of paint onto the second angular sector of pipe 10. As explained, the detected anomaly will be at the location on the pipe that is sprayed.

Although the operation of just one signal channel corresponding to one angular segment on the pipe has been described for each of the two inspection units, it will be understood that the other related channels are constructed similarly and function in a similar manner in response to any detected anomaly.

From the above description it is seen that the system of this invention provides an extremely versatile and accurate means for placing an indicia on an inspected pipe to indicate the location of a detected anomaly of a potentially harmful nature. The marking system does not place any limitations or restrictions on the normal operation of the nondestructive inspection apparatus. For example, the rotational speed of the search shoes 45 and 46 may be completely independent of the speed of longitudinal movement of pipe 10. The only requirement is that the complete surface of the pipe be scanned by the search shoes in order to have complete inspection coverage.

In terms of system operation the above fact is evident from FIGS. 5*a* and 5*b* wherein it is seen that defect anomaly signals detected by search shoes 31–38 of inspection unit number 1 are, in effect, temporarily stored in the respective flip flops 85 and then are shifted into and through respective shift registers 87 by the shift pulses on line 29, whenever these pulses occur. The shift pulses occur at a rate which is a function of the speed of longitudinal movement of pipe 10, and this speed may be any convenient speed, constant or changing. Similarly, defect anomaly signals detected by search shoes 45 and 46 of inspection unit number 2 are, in effect, temporarily stored in respective angular segment flip flops 112 and then are shifted into an intermediate stage of a respective shift register 87 and then to the output by the shift pulses on line 29. The respective flip flops will hold the detected anomaly signals as long as required in accordance with the described system operation.

It will be understood that the particular logic means and design illustrated in FIG. 5 for processing anomaly signals is exemplary only and that other means and designs could be used to practice the present invention. For example, shift registers 87 in fact provide timed delays of anomaly signals and other delay means and circuitry for operating them may be employed.

What is claimed is:

1. A method for placing indicia on an elongated object to indicate the position thereon where anomalies were detected by either one of first and second nondestructive inspecting units which are respectively spaced in advance of indicia producing means by respective first and second distances along a path of travel of an object being inspected, said method comprising moving said object along said path in one given direction to successively pass through said inspecting units and said indicia producing means, producing a timing pulse each time the object moves an incremental unit of length along said path, in said first inspecting unit producing anomaly signals in respective ones of N fixed inspection means disposed about said path in N angular segments in response to detected potentially harmful anomalies in corresponding angular segments of the object, said fixed inspecting means and said angular segments of the object being successively numbered proceeding in a given direction around said path from a reference position, transferring anomaly signals from said fixed inspection means to the inputs of a selected stage of respective ones of N shift registers.

shifting said anomaly signals through successive stages of the respective shift registers in response to successively occuring timing pulses, the number of stages of each shift register through which an anomaly signal from the first inspecting means is shifted to the output thereof being selected to correspond to the number of timing pulses that occur during the travel of a given position on the object from the first inspecting means to the indicia producing means, producing potentially harmful anomaly signals by second inspecting means that rotates about the object and successively scans said angular segments, producing a succession of N successively occuring angular segment pulses each of which has a time of occurrence and duration corresponding to the time the second inspection means is in a correspondingly numbered angular segment, directing by means of the angular segment pulses anomaly signals from the second inspecting means to respective ones of N signal lines to cause a second inspecting means anomaly signal emanating from a given numbered angular segment to occur on a correspondingly numbered signal line, transferring second inspection means anomaly signals on said signal lines to respective inputs of a second selected stage of correspondingly numbered ones of said shift registers, whereby the second inspection means anomaly signals are shifted through said registers by said timing pulses, the number of stages of each shift register through which second inspecting means anomaly signals are shifted to the output thereof being selected to correspond to the number of timing pulses that occur during the travel of a given position on the object from the second inspecting means to the indicia producing means, coupling anomaly signals from the output of each of said shift registers to a correspondingly numbered one of N indicia producing means which is positioned to place an indicia on a correspondingly numbered angular segment of the object as it passes thereby.

2. The method claimed in claim 1 wherein the steps of transferring fixed inspection means anomaly signals and second inspection means anomaly signals to respective shift registers each includes the steps of holding each said anomaly signal in a respective storage means and shifting it into the respective shift register in response to the next occurring timing pulse.

3. Apparatus for placing indicia on an elongated object to indicate the position thereon where detected anomalies exist, said apparatus comprising first and second inspecting units spaced along a path over which the object to be nondestructively inspected travels in one given direction, marking means along said path for placing indicia on said object at positions thereon where potentially harmful anomalies are detected by the two inspecting units, said first and second inspecting units being spaced from the marking means by respective first and second distances, wherein one of said distances includes a greater number of incremental unit lengths than the other distance, said first inspecting unit comprising a number N fixed inspection means disposed about said path in N angular sectors for producing an anomaly signal in an inspection means in response to detecting an anomaly in a respective angular sector of the object passing thereby, said fixed inspection means and said angular sectors of the object being successively numbered proceeding in a given direction around said path from a fixed reference position, said marking means comprising a plurality of N marking units each arranged to mark a respective one of said angular sectors, said second inspecting unit including at least one second inspection means that rotates about the object passing thereby to successively scan the sectors of the object for producing anomaly signals in response to detected potentially harmful anomalies in the object, means for producing a timing pulse each time the object moves an incremental unit of length along said path, a plurality of N shift registers each having a plurality of successive stages, means for coupling anomaly signals from each fixed inspection means to a first selected stage of a respective correspondingly numbered shift register, means for coupling said timing pulses to a shift input terminal of each shift register to shift anomaly signals through successive stages of the registers in response to the timing pulses, the number of stages of each shift register through which an anomaly signal from a fixed inspection means is shifted to the output thereof being selected to correspond to the number of timing pulses that occur during the travel of a given position on the object from the fixed inspection means to said marking means, means responsive to the rotation of said second inspection means for producing a succession of N successively occuring angular segment pulses each of which has a time of occurrence and a duration corresponding to the time the second inspection means is in a correspondingly numbered angular segment, means operable in response to said N angular segment pulses and said second inspection means anomaly signals for coupling said second inspection means anomaly signals to respective ones of N signal lines to cause a second inspection means anomaly signal emanating from a given numbered angular segment to occur on a correspondingly numbered signal line, means for coupling each of said signal lines to respective inputs of a second selected stage of correspondingly numbered ones of said shift registers, the number of stages of each shift register through which second inspecting means anomaly signals are shifted to the output thereof being selected to correspond to the number of timing pulses that occur during the travel of a given position on the object from the second inspecting means to said marking means, and means for coupling anomaly signals from the output of each shift register to a correspondingly numbered one of said marking units, thereby to actuate the appropriate marking unit in response to an anomaly signal to place an indicia on a correspondingly numbered angular segment of the object as it passes the marking means.

4. The combination claimed in claim 3 where the means for coupling said fixed inspection means anomaly signals and said signal lines to said shift registers each includes, means for temporarily storing each anomaly signal in a storage means and shifting it into its respective shift register in response to the next occurring timing pulse.

* * * * *